C. BERGMANN.
GAS HEATER.
APPLICATION FILED JULY 26, 1916.

1,304,531.

Patented May 27, 1919.
2 SHEETS—SHEET 2.

Inventor—
Conrad Bergmann,
by his Attorneys
Howson & Howson

UNITED STATES PATENT OFFICE.

CONRAD BERGMANN, OF PHILADELPHIA, PENNSYLVANIA.

GAS-HEATER.

1,304,531.  Specification of Letters Patent.  Patented May 27, 1919.

Application filed July 26, 1916. Serial No. 111,432.

*To all whom it may concern:*

Be it known that I, CONRAD BERGMANN, a citizen of the United States, residing in Philadelphia, Pennsylvania, have invented Gas-Heaters, of which the following is a specification.

One object of this invention is to provide an inexpensive, substantial and efficient gas burning device for heating water, the arrangement and construction of parts being such that a current of water flowing through the heating coil of the device shall have its temperature raised to the desired point in a relatively short time.

I further desire to provide a water heater which shall include a novel form of inclosing casing together with simple, yet reliable means for properly positioning the burner and the water heating coil.

Figure 1:
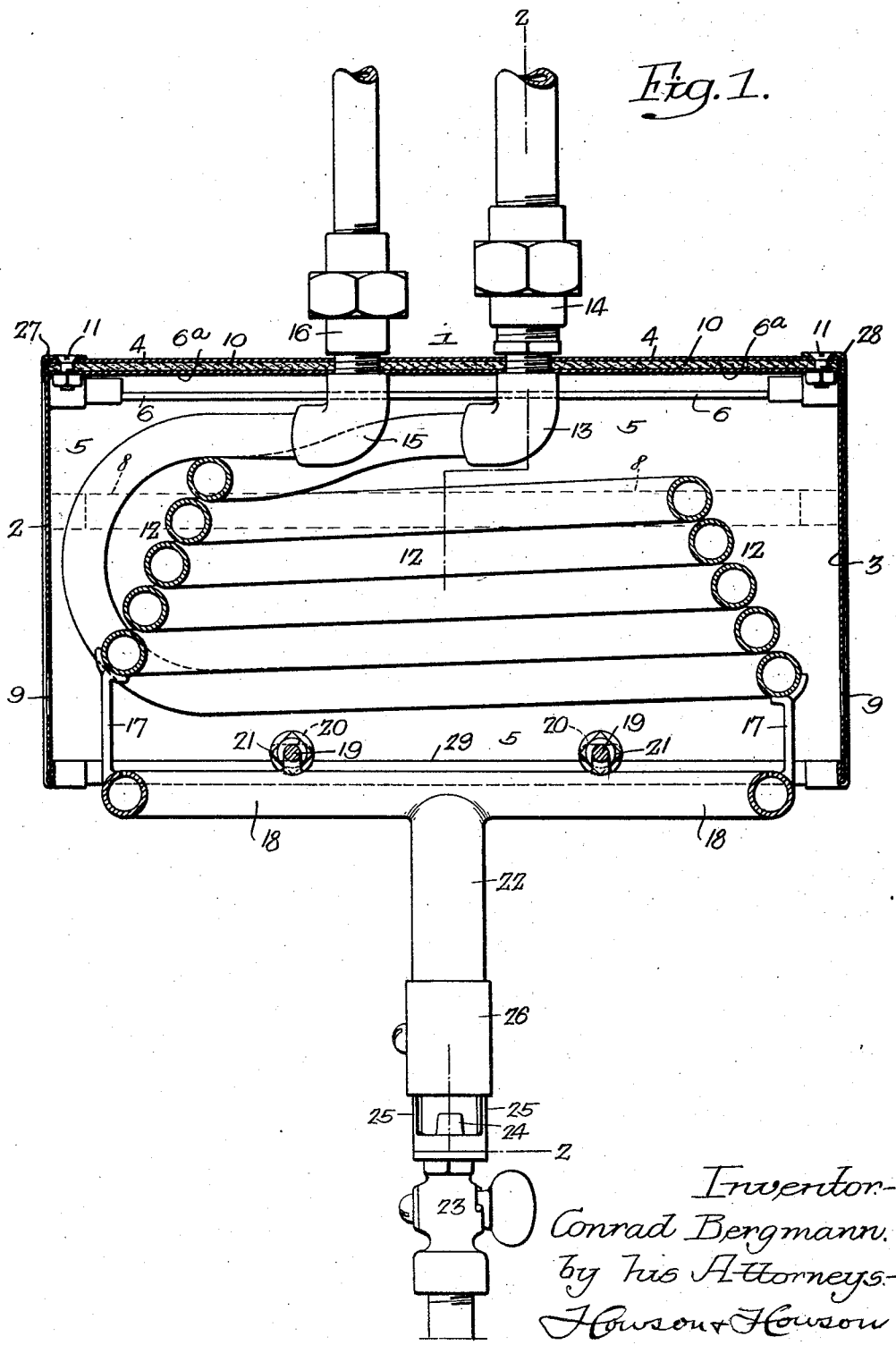
Figure 2:
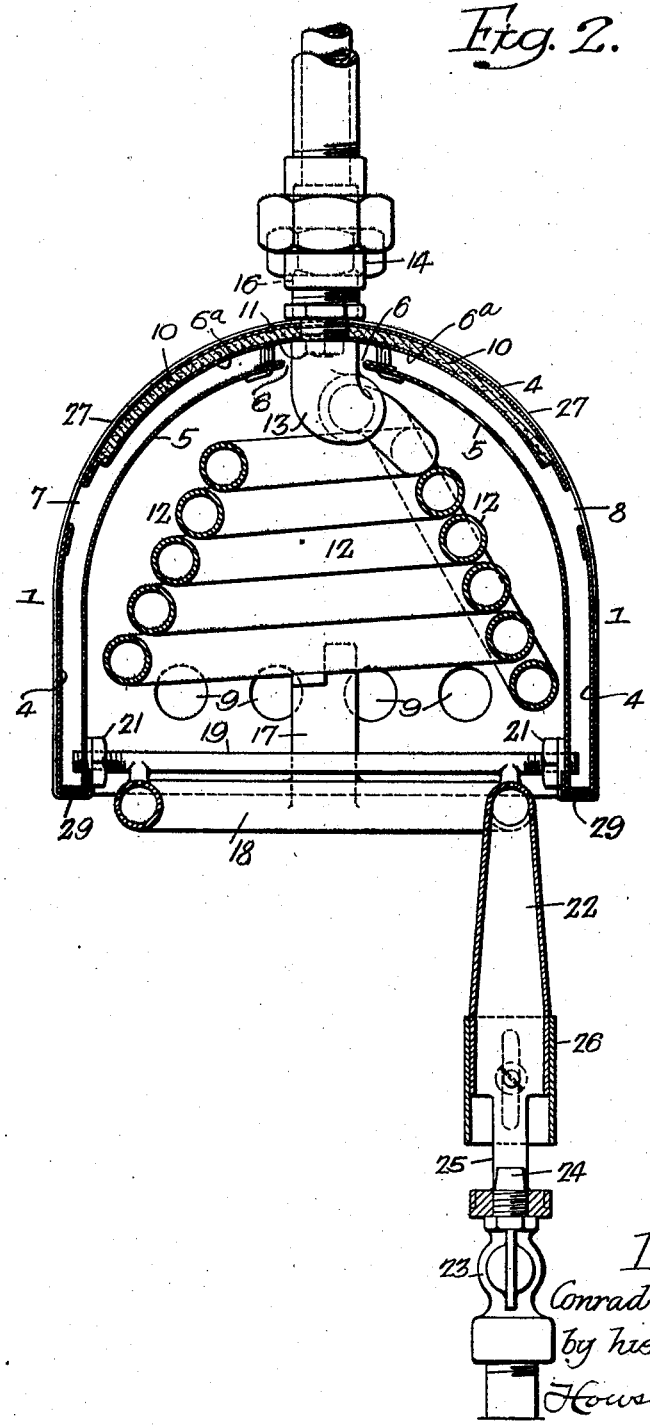

These objects and other advantageous ends I secure as hereinafter set forth, reference being had to the accompanying drawings, in which, Figure 1 is a vertical section illustrating the detail construction of a water heater constructed according to my invention; and Fig. 2 is a transverse vertical section on the line 2—2, Fig. 1.

In the above drawings 1 represents an elongated, substantially semi-cylindrical casing open on the flat side constituting its bottom and having heads 2 and 3 closing its ends, it being noted that each of said heads has adjacent its lower edge a series of holes 9 for the admission of air. The cylindrically curved portion of the casing, as shown in Fig. 2 is double walled, that is, it consists of an outer wall 4, and an inner wall 5 substantially parallel with but spaced apart from said first wall. This space between the inner and outer walls communicates with the interior of the casing through a relatively narrow elongated opening 6 extending from end to end of the heater at the highest portion thereof, and it likewise has openings 7 and 8 at opposite sides of the casing extending in the outer wall 4, from end to end thereof about half way up from its lower edge. Within the space between the two walls 4 and 5, I fix a sheet of asbestos or other heat non-conducting material 10, attaching it to the inner surface of the outer wall by any suitable means such as the bolts 11. Said non-conducting sheet preferably extends opposite the opening 6 where it is covered by a metal plate $6^a$ and it is run down to within a short distance of the side openings 7 and 8.

Within the casing 1, I mount a coil 12 of copper tubing which in conforming to some extent to the interior space of the casing has its individual convolutions elongated so that while they are semi-circularly curved at each end, they have straight side portions as shown in Fig. 2, it being noted that said convolutions regularly decrease in dimensions from the bottom to the top, both longitudinally and laterally. The free end of the upper convolution has a fitting 13, passing vertically out of the casing where it terminates in one member 14 of a union. The free end of the lowermost convolution is extended upwardly between the casing and the coil and is then bent horizontally to a fitting 15 connected to a part 16 of a second union designed to be attached to a water system.

While the heating coil 12 is in a large measure supported or suspended from the fittings 13 and 15, which are in turn carried by the casing, the lower convolution and hence to some extent those adjacent it is supported by brackets 17 extending upwardly from a burner tube 18. The latter is of practically the same form and dimensions as the lowest convolution of the heating coil and lies directly under, though spaced away from it, being supported by a pair of cross bolts 19 to which it is welded. Each of these bolts extends into horizontally elongated slots 20 formed in the lower portions of the inner wall 5 of the casing and is retained in any adjusted position by nuts 21 threaded upon its opposite ends, it being possible after the burner with its brackets 17 has been properly positioned relatively to the water heating coil 12, to run the nuts out on the bolts 19 until they grip the casing walls and hold the parts rigidly in position. By this means the burner tube 18 is held in place and the lower water heating coils are prevented from sagging.

At one side the burner tube 18 has a downwardly extending supply pipe and mixing tube 22 having a gas controlling valve 23 carrying a delivery jet 24 placed axially in line with said tube 22, the lower end of which is spaced away from said nozzle or jet by means of suitable members 25. A sleeve 26 is adjusted to slide on the tube 22 toward and from the fuel jet 24 for the purpose of varying the amount of air passing or drawn into it by the current of gas.

It is particularly to be noted that the various parts of the casing are connected or held in place by welding and with this idea in view the end plates 2 and 3 are held against or connected to the ends of the curved portion or body of the casing by angle members 27 and 28 which are spot- or otherwise welded at a suitable number of points both to said body portion and to the end plates or heads so as to make a relatively rigid structure. With the same idea in view the lower edge of the outer wall 4 of the body of the casing is bent in horizontally and then returned or bent upwardly adjacent the inside surface of the inner wall 5, as indicated at 29, and the ends of the angle sections 27 and 28 are likewise bent over this edge and extended up inside of the casing as shown.

Not only are the burner supporting bolts 19 welded to the burner tube but the brackets 17 are likewise rigidly and permanently secured to it in a similar manner, so that it is obvious that the device as a whole may be easily and quickly assembled. Moreover owing to the absence of bolts, screws and the like elements which are commonly used to connect sheet or other metal structures, the likelihood of any of the parts of my heater becoming separated either by long continued vibration or rough treatment is exceedingly remote.

Under conditions of use the combustible mixture of gas and air is delivered through the supply tube 22 into the burner from which it escapes through suitable small openings placed in the upper face thereof to direct the flames, which are formed when this mixture is ignited, onto the converging surfaces defined by the inner parts of the convolutions of the tube 12 through which water is caused to flow. The heat from such combustion is obviously transmitted to the water in said tube and the products of combustion escape through the opening 6 into the space between the walls 4 and 5 of the casing from which they finally pass into the atmosphere through the openings 7 and 8. In flowing through this space, however, the adjacent portions of the inner wall 5 are heated to a high temperature although the outer wall 4, owing to its protective covering of non-conducting material 10, remains in a comparatively cool condition. The heat from the inner wall 5 is radiated as well as carried by convexion currents so as to aid in heating the coils of the tube 12. In passing upward and through the opening 6 the products of combustion heat the ends of the tube as well as the inlet and outlet fittings associated therewith, there being preferably a sheet of relatively thin metal placed over the non-conducting sheet 10 directly opposite said opening 6. Obviously if desired any suitable flue or chimney connection may be made to the openings 7 and 8 to carry off the products of combustion escaping therefrom, although since this forms no part of my invention I have not illustrated it.

I claim:—

The combination in a water heater of a horizontally elongated casing open at the bottom; bars extending across the open bottom and projecting into horizontally elongated slots in the sides of the casing; adjustable means for rigidly holding said bars in any given position in said slots; a water-conducting coil mounted in the casing; and a burner integrally connected to the bars and supporting the lower part of the water coil.

CONRAD BERGMANN.

Copies of this patent may be obtained for five cents each, by addressing the "Commissioner of Patents, Washington, D. C."